United States Patent [19]
De Vincent et al.

[11] 3,853,148
[45] Dec. 10, 1974

[54] HOSE ASSEMBLY WITH ROUTING BRACKET
[75] Inventors: Patsy De Vincent, Dayton; Bruce E. Kirkham, Kettering, both of Ohio
[73] Assignee: General Motors Corporation, Detroit, Mich.
[22] Filed: May 18, 1973
[21] Appl. No.: 361,782

[52] U.S. Cl. ............................. 138/110, 248/74 R
[51] Int. Cl. ......................................... F16l 11/12
[58] Field of Search ........... 138/103, 106, 107, 109, 138/110, 118; 285/24, 27, 93, 62; 248/74 R, 74 A, 75

[56] References Cited
UNITED STATES PATENTS

| | | |
|---|---|---|
| 2,170,557 | 8/1939 | Guarnaschelli ................ 138/106 X |
| 2,683,468 | 7/1954 | Ikert .............................. 138/106 X |
| 2,700,988 | 2/1955 | Smisko ........................... 138/109 X |
| 2,853,262 | 9/1958 | Reimann ............................. 248/75 |
| 2,864,378 | 12/1958 | Schneller et al. ............... 138/110 X |

Primary Examiner—Herbert Goldstein
Attorney, Agent, or Firm—Arthur N. Krein

[57] ABSTRACT

A hose assembly including a hose fitting, a flexible hose secured at one end to the fitting and, a hose routing bracket, the hose routing bracket having a central web pre-bent to a desired hose routing path, a set of fingers at one end of the web fixed to suitable guide flats provided on the hose fitting and another set of fingers at the opposite end of the web encircling the hose and retaining it in the desired hose routing path relative to the guide flats on the hose fitting.

4 Claims, 4 Drawing Figures

PATENTED DEC 10 1974　　3,853,148

HOSE ASSEMBLY WITH ROUTING BRACKET

This invention relates to a hose assembly and, in particular, to a hose assembly having a hose routing bracket secured at one end to a hose fitting of the assembly and at its other end to the hose of the assembly.

In various applications in which a flexible conduit, such as a hose, is used to convey fluid, it is necessary to bend and route the flexible conduit around various structural or frame parts of the device on which the flexible conduit is being used to convey fluid. For example, on automotive passenger and truck vehicles, such flexible conduits in the form of brake hoses are used to convey hydraulic brake fluid to the individual wheel brakes of the vehicle. In some of these vehicles, the brake hose assemblies require extremely tight routing departures from, for example, the disc brake calipers of the vehicle to insure proper clearances between the hydraulic brake hose and other vehicle components. However, there are problems associated with a tightly routed and flexed brake hose such as, for example, from ozone cover checking.

Because of the above, tight routing departures from disc brake calipers have, in the prior art, normally been achieved by means of a bent steel tube and block subassembly that is crimped to one end of the hydraulic brake hose. Although this arrangement has proved adequate, it does introduce additional potential leak paths over a conventional non-routed hose assembly.

It is therefore a primary object of this invention to improve a hose assembly whereby a hose fitting is used with a hose routing bracket to permit tight routing of the hose from the fitting while providing reduced leakage paths on the assembly.

Another object of this invention is to improve a hose assembly whereby the hose is routed in a predetermined path during fabrication of the hose assembly by a hose routing bracket fixed to a hose fitting and to the hose of the assembly.

A further object of this invention is to provide a hose assembly having a tightly routed hose for use as a hydraulic brake hose which is relatively free from ozone cover checking.

These and other objects of the invention are attained in a hose assembly including a hose fitting, a flexible hose secured at one end to the hose fitting and a hose routing bracket having a central web pre-bent to a desired hose routing path, a set of fingers at one end of the web and a second set of fingers at the opposite end of the web adapted to encircle the hose, the hose fitting being provided with at least one orientation flat thereon against which the fingers at the one end of the web can be secured to establish the routing path of the hose from the hose fitting.

For a better understanding of the invention, as well as other objects and further features thereof, reference is had to the following detailed description of the invention to be read in connection with the accompanying drawings, wherein.

Figure 1:
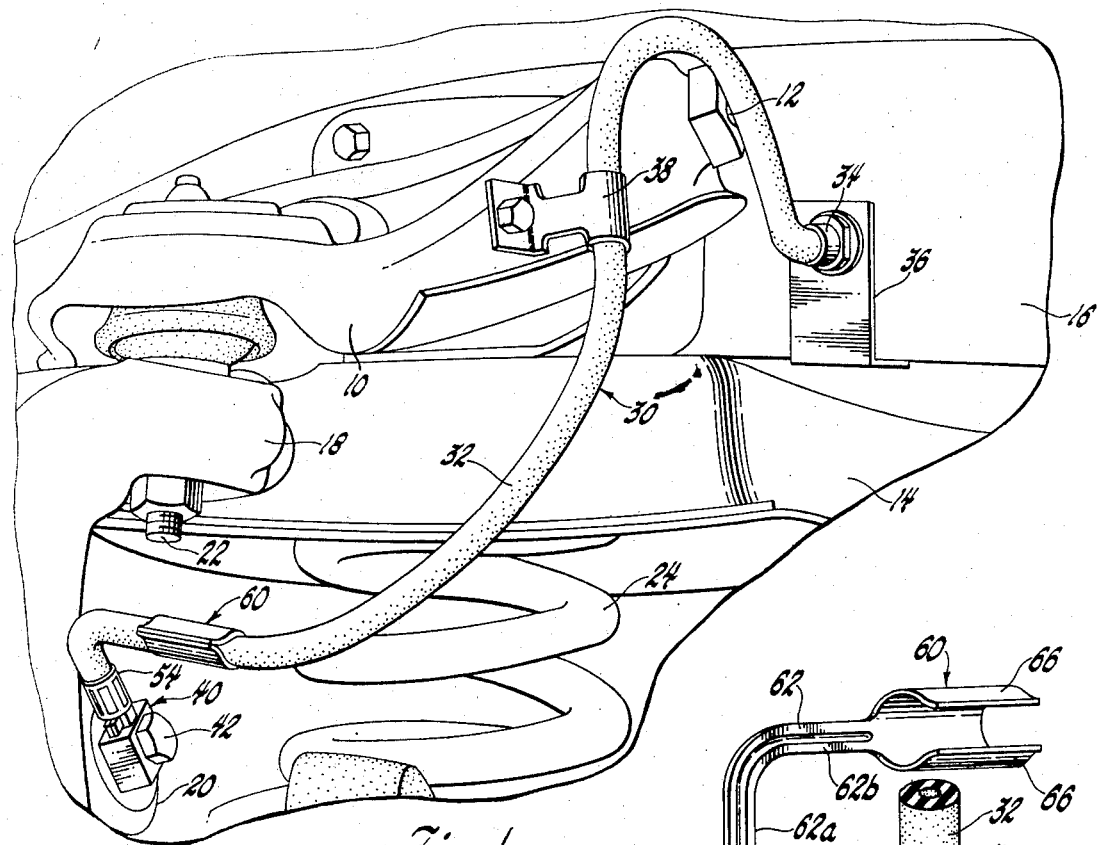
FIG. 1 is a perspective, somewhat schematic, view of a portion of the front end of a passenger vehicle having a hose assembly in accordance with the invention used as the hydraulic brake hose assembly for supplying hydraulic brake fluid to a disc brake caliper of the vehicle.

Referring now to FIG. 1, there is illustrated, for the purpose of showing an environment in which the hose assembly of the invention can be used, a portion of the front end of a conventional automotive vehicle provided with, for example, an independent suspension system. Such an independent suspension system includes an upper control arm 10 and a lower control arm, not shown, supported by an upper control arm shaft 12, and a lower control arm shaft, not shown, suitably attached to the suspension cross member 14 fixed to one of the side frames 16 of the vehicle. These control arms are connected to the steering knuckle assembly 18, supporting the wheel hub, not shown, and the disc brake caliper assembly 20, through pivoting ball socket assemblies 22, only a portion of one such ball socket assembly being shown. The coil spring 24 is located between the lower control arm and a formed seat in the suspension cross member 14.

Because of the movement of the above described elements relative to each other during vehicle operation, hydraulic fluid from the braking system, not shown, of the vehicle must be supplied to the disc brake caliper assembly 20 through a flexible conduit, usually in the form of a brake hose assembly, generally indicated by the reference numeral 30.

The brake hose assembly 30 includes a flexible brake hose 32 connected at one end to a hose fitting 34 secured to a conventional apertured support bracket 36 formed as an integral part of the side frame 16 or, as shown, as a separate element fixed to the side frame 16. The hose fitting 34 is provided with one or more orientation guides thereon, not shown, so that it can only properly mate with the aperture in the support bracket 36 in one direction, as is known in the art. The fitting 34 is adapted in a known manner to be detachably secured to a conduit, not shown, forming part of the braking system for the vehicle.

To permit proper flexing and other movement of the brake hose during vehicle operation, the length of the brake hose is greater than the straight line distance between the hose fitting 34 and the disc brake caliper assembly 20 and is also of an adequate length to distribute movement during flexing and to avoid abrasion.

As shown, the brake hose 32 is held away from the upper control arm 10 by a hose bracket 38 of the type disclosed in copending United States application Ser. No. 361,781 filed concurrently herewith on May 18, 1973 in the name of Patsy DeVincent and John V. Hepke, and the brake hose is bent or looped between this hose bracket 38 and the hose fitting 34 in the same plane as the motion of the upper control arm 10 relative to the side frame 16 to prevent twisting and distortion of the brake hose.

At its other end, such a brake hose as used in the prior art would be connected through a bent tube adapter, not shown, fixed to a banjo secured to the disc brake caliper assembly in order to provide for the sharp angle bend required for fitting of the brake hose in a departure path from between the arms of the steering knuckle assembly. Such a typical prior art hose connection is shown and described, for example, in the above identified referenced copending United States application Ser. No.

Now in accordance with the invention, the opposite end of the brake hose 32 is fitted and crimped to a banjo fitting 40 secured to the disc brake caliper assembly 20 by a conventional threaded hose to caliper bolt 42, the bolt being provided, as is well known, with a suitable passage therein for the flow of hydraulic brake fluid, a hose routing bracket, generally designated 60, being fixed to the banjo fitting 40 and to the brake hose 32 in a manner to be described, to provide the desired hose orientation and departure angles relative to the banjo fitting.

Figure 2:
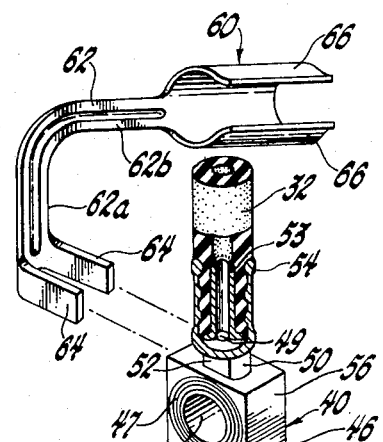
FIG. 2 is a partial exploded perspective view of the hose fitting, flexible hose and hose routing bracket of the hose assembly of FIG. 1 with the hose routing bracket shown prior to its assembly to the hose fitting.

The banjo fitting 40, as best seen in FIG. 2, includes a block portion 44 having opposed parallel mounting surfaces 46 with annular serrations 47 thereon to mate against seal washers, not shown, interposed between these surfaces and the head of bolt 42 and the disc brake caliper assembly 20, and a bore or opening 48 therethrough to receive the hose to caliper bolt 42, a centrally apertured 49 shank portion 50 having one or more guide or orientation surfaces, such as the guide flats 52 as seen in FIG. 2, for example, thereon. A conventional hose nipple or eyelet 53 is secured to the free end of the shank portion with the passage therein in communication through the aperture 49 in the shank portion with the opening 48 in the block portion 44, the eyelet being of a size to be inserted in the internal passage of the hose 32, as is well known. An outer sleeve or collar 54 which may be formed as a separate part or, as shown, as an integral part of the banjo fitting, is of a diameter to receive and snugly encompass the exterior of the hose and which is then crimped or swaged, as shown, around the hose in a conventional manner to secure the hose to the eyelet 53 of the banjo fitting.

The block portion 44 is considered the coupling end of the fitting 40, while the eyelet 53 together with the collar portion 54, if integral, form the hose connecting end of the fitting. The orientation or guide flats 52 are located relative to one or more orientation surfaces on the block portion of the banjo fitting, such as one mounting surface 46 and one side 56 of the block portion used to effect proper alignment of the coupling end of the banjo fitting to the disc brake caliper assembly 20 in a predetermined location.

The guide flats 52 are parallel to each other and are, as shown, parallel, as seen in FIG. 2, to the mounting face 46 of the banjo block portion 44 of the banjo fitting, that is, at right angle to the axis of the bore 48. It should, however, be realized that these orientation flats can be positioned as desired relative to the mounting surfaces 46 of the block portion 44 of the banjo fitting or to the axis of bore 48 to provide the desired hose orientation and departure angles from the banjo fitting as required for a particular installation, taking into consideration the entire routed length of the hose and its general orientation as established by the hose mounting bracket 38 and hose fitting 34 to prevent unnecessary twisting of the hose, since any twisting of the hose will affect the useful life of the brake hose.

The hose routing bracket 60, made of relatively thick gage material to resist bending, as best seen in FIG. 2, includes a reinforced central web portion 62 pre-bent into the desired departure routing angle which, in the embodiment illustrated, has one leg 62a of the web portion at approximately 90° to the other leg 62b of this web portion. As shown, the legs 62a and 62b lie in a common plane, but if desired, they can be also bent relative to each other so that leg 62b lies in a plane at any desired angle relative to the plane of leg 62a to provide for a desired departure angle while still providing the desired bend in hose 32. Integral with one end of the web portion, the leg 62a end, is a pair of deformable fingers 64 and at the opposite end of the web portion, the leg 62b end, is another set or pair of deformable fingers 66 adapted to engage the hose 32.

Figure 3:
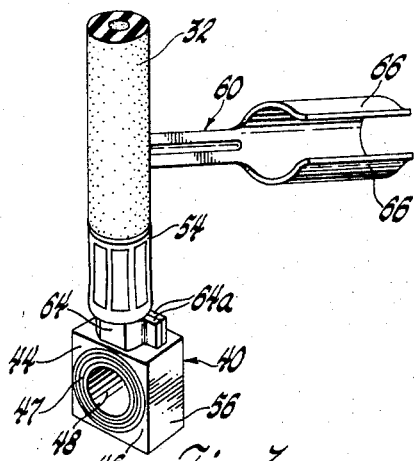
FIG. 3 is a view similar to FIG. 2 but showing the hose routing bracket secured at one end to the hose fitting of the hose assembly; and, FIG. 4 is a view similar to FIGS. 2 and 3 showing the hose routing bracket completely assembled to the hose fitting and to the flexible hose of the hose assembly.

Before assembly to the banjo fitting 40, the fingers 64 of the hose routing bracket extend parallel to each other and at right angles outward from the web portion 62 with these fingers being spaced apart just sufficiently to slidably receive the guide flats 52 on the shank portion 50 of the banjo fitting therebetween, these fingers being positioned between the block portion 44 and the collar 54 of the banjo fitting. After being positioned on the banjo fitting 40 in the manner described above, the free ends of these fingers 64 are then crimped together to the position 64a, as shown in FIG. 3, whereby this end of the hose routing bracket is fixed to the banjo fitting in properly orientated position thereon to prevent either axial or rotational movement with respect to each other.

Figure 4:
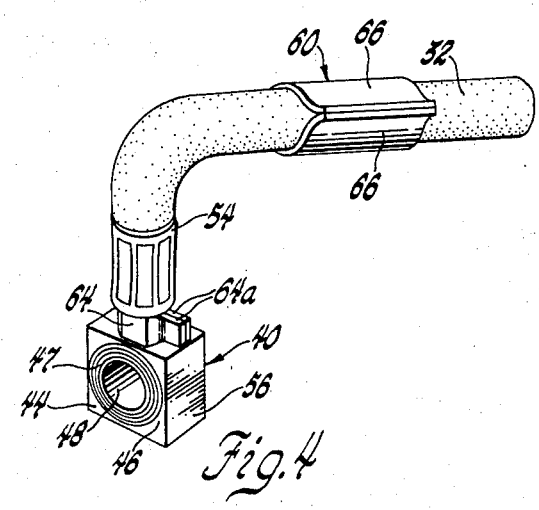

The fingers 66 of the hose routing bracket, which may be curved as shown in FIG. 2, to partly conform to the outer diameter of the hose 32, prior to assembly thereon, extend outward from the leg 62b of the web portion 62 and form therewith, in effect, a split hose clamp collar adapted to receive the hose 32. To assemble the hose 32 to the split hose clamp collar, the hose is bent to the position shown in FIG. 4 and inserted between the fingers 66 of the hose routing bracket after which the fingers 66 are crimped together to engage the hose to securely lock the hose to the hose routing bracket 60 in the desired departure angle from the banjo fitting 40. This departure angle, as previously described, is established by the hose routing bracket connection as determined by the guide flats 52 thereon and by the angle established by the pre-bent web portion 62 of the hose routing bracket.

With this arrangement, although the hose itself is tightly routed in its departure path from the banjo fitting 40, ozone cover checking is not a problem because the integral hose routing bracket 60 as fixed to the banjo fitting and to the hose does not permit the hose to flex.

It is to be realized that although the hose routing bracket 60 is illustrated as being used with a banjo fitting in the hose assembly shown, it is to be realized that it could be used with any suitable type hose fitting, either male or female, it only being necessary that such a fitting be provided with suitable orientation guides thereon which may be similar to that described on fitting 34 so that it can only properly mate with its associated element in one direction and with suitable orientation or guide flats, similar to the flats 52 of banjo fitting 40 to receive the fingers 64 of bracket 60.

What is claimed is:

1. A hose assembly including a hose fitting having a first end including means to be inserted into and crimped to an end of a flexible hose, a second end having at least one orientation mounting surface thereon and an intermediate portion with at least one guide surface means thereon in a predetermined angular relationship to said mounting surface, a flexible hose connected at one end to said first end of said hose fitting and, a rigid pre-bent hose routing bracket having one end aligned by said guide surface means relative to said orientation mounting surface and secured to said hose fitting at said intermediate portion and having its opposite end secured to said flexible hose, said flexible hose being retained bent adjacent to said end of said hose secured to said fitting by said hose routing bracket.

2. A hose assembly according to claim 1 wherein said guide surface means of said hose fitting includes two parallel guide flats on opposite sides of said intermediate portion and wherein said hose routing bracket includes a central web portion having one end portion thereof bent relative to the other end portion thereof, a set of fingers at one end and integral with the web fixed to and aligned by said parallel guide flats on said intermediate portion of said hose fitting and another set of fingers at the opposite end of said web integral therewith encircling said hose and crimped thereto.

3. A hose assembly including a hose fitting having at one end thereof a block portion with parallel opposed mounting surfaces thereon and a through bore extending between said surfaces and at its opposite end a sleeve with a shank portion therebetween, said shank portion having an aperture therethrough to said bore, an eyelet coaxially disposed with respect to said sleeve and having a passage therethrough in communication with said aperture, said shank portion having at least one guide surface means on the exterior thereof in a predetermined position relative to said mounting surfaces, a flexible hose having one end encircling said eyelet and compressibly encircled by said sleeve and, a rigid hose routing bracket pre-bent intermediate its ends and having one end aligned by said guide surface means and secured to said shank portion and having its opposite end secured to said flexible hose, said hose being bent to conform to the bend in said hose routing bracket.

4. A hose assembly according to claim 3 wherein said hose routing bracket includes a pre-bent web portion, a set of fingers at one end integral with the web portion fixed to and aligned by said guide surface means on said shank portion and a second set of fingers at the opposite end of said web integral therewith crimped into encircling engagement with said hose.

* * * * *